(12) United States Patent
Zhou et al.

(10) Patent No.: US 9,857,186 B2
(45) Date of Patent: Jan. 2, 2018

(54) SYSTEM AND METHOD FOR LONG-HAUL TRIP PLANNING FOR COMMERCIAL VEHICLES TRANSPORTATION

(71) Applicant: SAP SE, Walldorf (DE)

(72) Inventors: Wenjun Zhou, Shanghai (CN); Wen-Syan Li, Shanghai (CN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 15/068,090

(22) Filed: Mar. 11, 2016

(65) Prior Publication Data

US 2017/0261330 A1 Sep. 14, 2017

(51) Int. Cl.
*G01C 21/34* (2006.01)

(52) U.S. Cl.
CPC ....... *G01C 21/343* (2013.01); *G01C 21/3469* (2013.01); *G01C 21/3492* (2013.01)

(58) Field of Classification Search
USPC .................. 701/123, 517, 519, 521; 705/7.16
See application file for complete search history.

(56) References Cited

U.S. PATENT DOCUMENTS

| | | | | |
|---|---|---|---|---|
| 6,144,916 A * | 11/2000 | Wood, Jr. | ............... | G01S 5/0027 340/993 |
| 6,154,658 A * | 11/2000 | Caci | ........................ | H04M 11/04 455/466 |
| 6,807,481 B1 * | 10/2004 | Gastelum | ........... | G01C 21/3697 340/438 |
| 2007/0149184 A1 * | 6/2007 | Viegers | .................. | G06Q 10/06 455/422.1 |
| 2011/0022298 A1 * | 1/2011 | Kronberg | ........... | G01C 21/3484 701/532 |
| 2016/0011001 A1 * | 1/2016 | Emory | ............... | G01C 21/3492 701/465 |
| 2016/0109251 A1 * | 4/2016 | Thakur | ............... | G01C 21/3415 705/335 |
| 2016/0379168 A1 * | 12/2016 | Foerster | ........... | G06Q 10/06311 705/7.16 |
| 2017/0030724 A1 * | 2/2017 | Axelrod | ................. | G01C 21/34 |

\* cited by examiner

*Primary Examiner* — Richard Goldman
(74) *Attorney, Agent, or Firm* — Brake Hughes Bellermann LLP

(57) ABSTRACT

A computer system for controlling operation of a vehicle travelling from a starting location to a target location includes a memory and a semiconductor-based processor forming one or more logic circuits configured to generate a travel itinerary by selecting different highway segments on a map for the vehicle to drive over at respective speeds from the starting location to the target location subject to an arrival time deadline for arriving at the target location. Each of the highway segments has a distance that can be driven at the respective speed in less than a continuous driving time limit. The computer system sends the travel itinerary to a vehicle operator to drive the vehicle over the different highway segments with instructions to make a stop at the end of each highway segment to stay below the continuous driving time limit.

20 Claims, 12 Drawing Sheets

| Notation | Description |
|---|---|
| $F_{ab}$ | Liter/Kilometer, Fuel consumption at speed $a$ $km/h$ and loading $b$ $ton$, <br> $a = 1,2,...,A$    $A$ is maximum speed, $km/h$ <br> $b = 1,2,...,B$    $B$ is maximum loading, $ton$ |
| $N_i$ | Station $i$ (Node $i$) <br> $i = 1,2,...,M$ |
| $E_{jk}$ | Highway segment between station $j$ and station $k$ (Edge $jk$) <br> $j = 1,2,...,M$ <br> $k = 1,2,...,M$ |
| $D_{jk}$ | Distance of the highway segment between station $j$ and station $k$, km <br> $j = 1,2,...,M$ <br> $k = 1,2,...,M$ |
| $L$ | Loading |
| $Ns$ | Starting node |
| $Nd$ | Destination node |
| $Ts$ | Starting time |
| $Ta$ | Arrival time |
| $Td$ | Maximum continuous driving hours, e.g., 4 |
| $Tb$ | Break time, e.g., 0.5 means break for half an hour |
| $Ti$ | Meal interval in hours, e.g., 6 |
| $Tm$ | Meal time, e.g., 0.5 means have a meal for half an hour |
| $T_n$ | Time unit $n$ <br> $n = 0,1,2,...,N$ |
| $S(n,j,k)$ | Average speed of the highway segment between station $j$ and station $k$ if the truck starts from station $j$ at time unit $T_n$ <br> $n = 0,1,2,...,N$ <br> $j = 1,2,...,M$ <br> $k = 1,2,...,M$ |
| $T(n,j,k)$ | Time needed if the truck starts from station $j$ at time unit $T_n$ and go to station $k$ <br> $$T(n,j,k) = \frac{D_{jk}}{S(n,j,k)}$$ <br> $n = 0,1,2,...,N$ |

| | |
|---|---|
| $F(n, j, k)$ | Fuel consumption if the truck starts from station $j$ at time unit $T_n$ and go to station $k$<br>$F(n, j, k) = F_{S(n,j,k)b} D_{jk}$<br>$n = 0,1,2,\ldots,N$<br>$j = 1,2,\ldots,M$<br>$k = 1,2,\ldots,M$ |
| $X(n, j, k)$ | $X(n, j, k)$<br>$= \begin{cases} 1 & \text{if the truck starts from } N_j \text{ at } T_n \text{ and drives to } N_k \\ 0 & \text{otherwise} \end{cases}$<br>$n = 0,1,2,\ldots,N$<br>$j = 1,2,\ldots,M$<br>$k = 1,2,\ldots,M$ |
| $Y(n, i)$ | $Y(n, i) = \begin{cases} 1 & \text{if the driver takes a break at } N_i \text{ at } T_n \\ 0 & \text{otherwise} \end{cases}$<br>$n = 0,1,2,\ldots,N$<br>$i = 1,2,\ldots,M$ |
| $Z(n, i)$ | $Z(n, i) = \begin{cases} 1 & \text{if the driver has a meal at } N_i \text{ at } T_n \\ 0 & \text{otherwise} \end{cases}$<br>$n = 0,1,2,\ldots,N$<br>$i = 1,2,\ldots,M$ |
| $F(n, i)$ | Minimum fuel consumption from station $i$ to the destination, if the truck starts from station $i$ at time unit $T_n$<br>$n = 0,1,2,\ldots,N$<br>$i = 1,2,\ldots,M$ |
| $S(i)$ | Successor of node $i$ |

TABLE 501 (Speed-Fuel Consumption)

| Column name | Description |
|---|---|
| Loading | Loading (e.g., weight) of vehicle, tons |
| Speed | Speed of vehicle, km/h |
| Fuel consumption | Fuel consumption of vehicle, liters/km |

TABLE 502 (Highway Segments)

| Column name | Description |
|---|---|
| Segment ID | Identity of highway segment |
| Segment name | Name of highway segment |
| Station A | Identity of station A |
| Station B | Identity of station B |
| Distance | km, distance between station A and station B |

TABLE 503 (Historical Traffic Data)

| Column name | Description |
|---|---|
| Segment ID | Identity of highway segment |
| Start time | Start time from station A |
| Average speed | Average speed on the highway segment |

TABLE 504 (Stations data)

| Column name | Description |
|---|---|
| Station ID | Identity of station |
| Station name | Name of station |
| Has break | If the driver can break at the station, = 1 otherwise = 0 |
| Has meal | If the station provides the meal, = 1 otherwise = 0 |

FIG. 5

TABLE 601 (Highway Segments)

Path

| Column name | Description |
|---|---|
| Sequence | Sequence of the path |
| Segment ID | Identity of highway segment |
| Start time | Start time from station A |
| Speed | Suggested speed at the highway segment |
| Fuel consumption | Fuel consumption at the highway segment |
| Time | Time used at the highway segment |

TABLE 602 (Break)

Break

| Column name | Description |
|---|---|
| Sequence | Sequence of the break |
| Time | Time to have a break (when) |
| Station ID | Identity of station (where) |

TABLE 603 (Meal)

Meal

| Column name | Description |
|---|---|
| Sequence | Sequence of the meal |
| Time | Time to have meal (when) |
| Station ID | Identity of station (where) |

FIG. 6

```
1    Function planTrip(Fuel, Station, Segment, Traffic):
2    % Input:  Fuel - Relationship between speed, fuel consumption
and loading
3              Station - Station info
4              Segment - Highway segment info including distance
5              Traffic - Predicted traffic data for each segment
6    % Output: Path - Path with speed at each segment and starting
time at each station
7              Break - Stations and time for break
8              Meal - Stations and time for meal
9
10   Format segments to nodes
11   Initialize input parameters including L, Ns, Nd, Ts, Ta, Td,
Tb, Ti, Tm
12   Select the speed fuel consumption based on L
13
14   For each i in M
15       For each n in N
16           If i==Nd
17               F(n,i)=0
18           Else
19               F(n,i)=INT_MAX
20           End if
21       End for
22   End for
23
24   For each j in M
25       For each k in M
```

```
                         ↓ Continued
1           For each n in N
2               If n+T(n,j,k)>N
3                   F(n,j,k)=INT_MAX
4               End if
5           End for
6       End for
7   End for
8
9   While List.size()>0
10      j = List.get(0)
11      List.remove(0)
12      For each i in j's neighbors
13          For each n in N
14              If F(n,i)>F(n,i,j)+F(n+T(n,i,j),j)
15                  F(n,i)=F(n,i,j)+F(n+T(n,i,j),j)
16                  S(i)=j
17              End if
18              For each n in N
19                  If F(n,i) is reduced && !List.contains(i)
20                      List.add(i)
21                  End if
22              End for
23          End for
24      End for
25  End while
26
27  For each j in P
28      For each k in P
29          Calculate F(n,j,k)'
30      End for
31  End for
32  Combine the result
33
34  For each i in P
35      If Td and Ti are met
36          Insert Tb, update Y(n,i)
37          Insert Tm, update Z(n,i)
38      Else Go to line 34
39      End if
40  End for
41
42  Return Path, break, meal
```

SYSTEM AND METHOD FOR LONG-HAUL TRIP PLANNING FOR COMMERCIAL VEHICLES TRANSPORTATION

BACKGROUND

Global positioning system (GPS) and other navigation systems or map services (e.g., Google Maps, MapQuest, etc.) can provide highway or route directions for a vehicle to go from a current location to a target destination. These navigation systems or map services may first detect the vehicle's current location, and then, with reference to geographical highway maps, identify different paths or routes from the vehicle's current location to the target destination. The navigation systems and map services may present one or more of the paths or routes to the vehicle operator as suggested paths or routes for the vehicle operator to follow to go from the current location to the target destination. The suggested paths or routes may be based on calculations of travel distance (e.g., shortest route), or based on calculations of travel time (e.g. fastest route) using historical traffic conditions data for different paths and routes.

The navigation systems and map services, which may be targeted for short-haul or medium-haul driving, suggest paths or routes to drive, but do not provide suggestions for when a driver should make stops or take breaks (e.g., a rest stop, or a meal break). Such stops or breaks which limit continuous driving hours are desirable (e.g., for safety) in long-haul driving.

Consideration is now being given to systems and methods for long-haul trip planning for commercial vehicles on dynamic considerations of multiple constraints including, for example, vehicle speed, fuel economy, limits continuous driving hours and requirements for driver meal breaks and rest stops.

SUMMARY

In a general aspect, a computer system for controlling operation of a vehicle includes a memory and a semiconductor-based processor forming one or more logic circuits. The logic circuits generate a travel itinerary or plan by selecting different highway segments on a map for the vehicle to drive over at respective speeds from the starting location to the target location subject to an arrival time deadline for arriving at the target location. Each highway segment identified in the travel itinerary or plan has a distance that can be driven at the respective speed in less than a continuous driving time limit. The logic circuits send the travel itinerary to a vehicle operator to drive the vehicle over the different highway segments at the respective speeds from the starting location to the target location. The travel itinerary including instructions to make a stop at the end of each highway segment to stay below the continuous driving time limit.

In an aspect, the computer system when selecting the different highway segments identifies a station at the end of each highway segment where the operator of the vehicle can rest, take a meal or refuel the vehicle. The instructions included in the travel itinerary by the computer system to make a stop at the end of each highway segment include a recommended break time or a recommended meal time for the stop at identified station at the end highway segment. The identified station can be a highway rest stop, a refueling station, a hotel or motel, a town, city or village or any place with facilities where the vehicle operator can obtain services.

In a further aspect, the computer system when selecting the different highway segments identifies a start time for each highway segment, determines the respective speed based on historical traffic conditions over the highway segment at the start time and determines a fuel consumption of the vehicle for each highway segment based on the determined respective speed and a speed-fuel consumption characteristic (e.g., a load-dependent speed-fuel consumption characteristic) of the vehicle. Selecting the different highway segments may include selecting the different highway segments to minimize a total fuel consumption in driving the vehicle from the starting location to the target location.

The details of one or more implementations are set forth in the accompanying drawings and the description below. Further features of the disclosed subject matter, its nature and various advantages will be more apparent from the accompanying drawings the following detailed description, and the claims.

BRIEF DESCRIPTION OF THE DRAWINGS

FIG. 4 is an example table, which lists terminology used herein to describe an objective function.

FIG. 5 includes example tables which illustrate the input data that may be available from several databases described herein.

FIG. 6 includes example tables, which illustrate the output data which may be included by a navigation handler in a planned travel itinerary for driving a vehicle between two locations, in accordance with the principles of the present disclosure.

FIG. 8 is an illustration of example pseudo-code for performing the elements of the method of FIG. 7, in accordance with the principles of the present disclosure.

DETAILED DESCRIPTION

Figure 1:
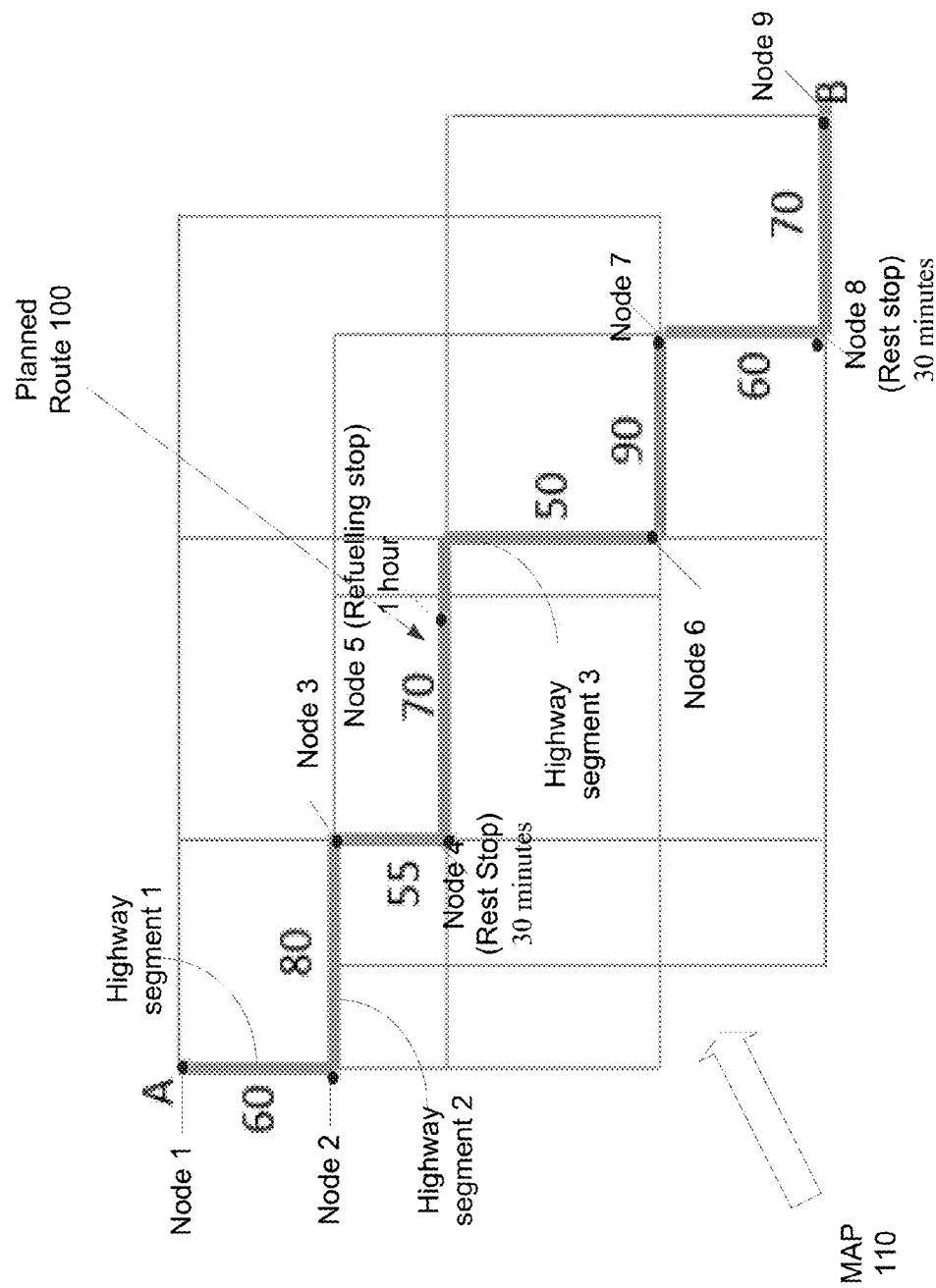
FIG. 1 is a schematic illustration of a planned route on a map for the vehicle to go from a starting location to a target location, in accordance with the principles of the present disclosure.

Systems and methods (collectively "navigation solution") for controlling a vehicle's operation, while travelling from a current location to a target destination, based on dynamic consideration of one or more constraints are described herein. The navigation solutions may be used for long-haul trip planning (e.g., for a commercial vehicle transporting loads from one city to another) including consideration of fuel economy, and constraints such as starting time, arrival time, and limits on continuous driving time. Additional constraints may include arrival time deadlines, traffic conditions, vehicle type and vehicle load constraints, etc. The navigation solution may generate a planned travel itinerary which includes planned rest stops to break up the travel itinerary in segments to satisfy the limits on continuous driving time (which may be based on safety considerations or government or company policies). The travel itinerary may include both spatial and temporal aspects (i.e. geographical highway segments, distances, turns, direction, vehicle speeds and timing, start times, halts or stops, and end times, etc.). The planned travel itinerary may dynamically change as the vehicle travels along a planned route, for example, in response to dynamically changing traffic or highway conditions.

Example long haul trips (for which the navigation solutions may be used) may, for example, include trips by commercial vehicles such as trucks transporting loads from one city to another city (e.g. from Shanghai to Beijing or Xi'an) which often can take ten hours or more to complete, or trucks transporting loads from an eastern location to a western location across a continental region (e.g., China), which often can take several days to complete.

Driving on long haul trips may be interrupted for various reasons or events that do not occur or are not important in short haul trips (e.g., trips within a city). Under applicable driver regulations, a driver of commercial vehicle may be limited to maximum (e.g., four hours) of continuous driving before being required to take a mandatory break (e.g., a break of at least 20 minutes) before resuming driving. Further, in long haul trips, it may be necessary to interrupt driving at various times, for example, for vehicle refueling, for vehicle drivers to take meals, rest or sleep, etc. The navigation solutions described herein, in addition to direction or route navigation (e.g., to obtain the shortest route and to avoid traffic jams, etc.) may provide a more complete trip plan or travel itinerary for the long-distance driving. The trip plans or travel itinerary may include, for example, details on when and where the vehicle driver should take a break or a rest stop, have a meal or refuel the vehicle. The travel itinerary for the long-distance driving may identify or suggest highway service stations or rest stops along the travel route where the driver can take a break, have a meal, refuel the vehicle, etc.

In an example implementation, the navigation solution described herein may be used in conjunction with location or positioning systems (e.g., GPS systems, RFID systems, optical camera systems, cell tower triangulation systems, etc.) that may detect and provide information on the vehicle's location. The location or positioning systems may include self-reporting systems (telephone, internet, cell phone etc.) by which a user can enter or provide information on the vehicle's location.

In an example navigation solution for a long haul trip plan (e.g., for a vehicle transporting a load from one city to another), loading (e.g., load weight) may be considered as a factor in generating a fuel efficient travel itinerary or plan, since vehicle load (in addition to speed) affects fuel consumption by the vehicle. For a given vehicle speed, it may be expected that a large load will result in more fuel consumption than a small load being hauled by the vehicle.

Further, in the example navigation solution, the travel itinerary may be broken up into one ore more highway or road segments between stations (e.g., between different rest stops or service stops). A projected or planned vehicle speed along each highway or road segment in the travel itinerary may be based on time dependent projections or information about expected traffic conditions on the highway or road segment. For example, for a planned departure of a vehicle from a location A at time T for a next location B, the projected or planned vehicle speed on the highway segment A-B may be based on the traffic conditions at time T on the highway segment A-B. With the consideration of time dependent traffic conditions, the example navigation solution may plan out a travel itinerary including when and where the vehicle should stop, for example, to avoid traffic jams, and satisfy other constraints for the trip (e.g., maximum continuous driving hours, starting time and arrival time constraints, etc.).

In an example implementation, the navigation solution described herein for a long haul trip plan may generate a planned travel itinerary including a planned route for the vehicle to go from a starting location to the target destination. The planned route may identify highway distance segments ("highway segments") between nodes or stations on a map and also recommend speeds at which the vehicle could traverse each highway segment between stations. The nodes or stations may correspond to rest stops or service stations where the vehicle driver, for example, can service the vehicle (e.g., refuel the vehicle), or take a break (e.g., to stay under limits on continuous driving hours), take rest or have a meal. Thus, a planned route may include a series of highway segments between nodes or stations, with the highway segments characterized being by distance and recommended vehicle speed. The nodes or stations (when rest stops or service stations) in the planned route may be associated with designated time periods for breaks in driving (e.g. for servicing the vehicle, driver rest, meals, etc.).

FIG. 1 shows, for example, a planned route 100 on a map 110 for the vehicle to go from a location "A" to a location "B." Planned route 100 may include multiple nodes (e.g., node 1, node 2, node 3, etc.) with each pair of consecutive nodes defining a highway segment there between. For example, node 1 and node 2 may define a highway segment 1 there between, node 2 and node 3 may define a highway segment 2 there between, etc. For purposes of illustration, each of the highway segments shown in FIG. 1 is annotated with a number corresponding to a recommended vehicle speed for that segment. For example, highway segment 1 and highway segment 2 are annotated with numbers 60 and 80 corresponding to recommended vehicles speeds for highway segment 1 and highway segment 2, respectively.

One or more of the nodes may correspond to service stations or rest stops for planned breaks in driving for driver rest, vehicle servicing, etc. For example, node 4 and node 8 may be rest stops, and node 5 may be a vehicle refueling station. Stops at these nodes or stations (hereinafter "break stations") may be scheduled in the planned travel itinerary. Each of the break stations may be associated with a "break" time period or interval allotted for the vehicle driver, for example, to stop continuous driving, to take rest or a meal, or to service the vehicle. For purposes of illustration, each of these break stations (e.g., node 4, 5 and 8) shown in FIG. 1 is annotated with a number corresponding to a recommended break time interval (e.g., 30 minutes, 1 hour, and 30 minutes respectively). Each of the break stations on the planned route may be selected so that the continuous driving time between the break stations is less than a maximum continuous driving time that the vehicle driver is allowed (e.g., 4 hours).

Figure 2A:
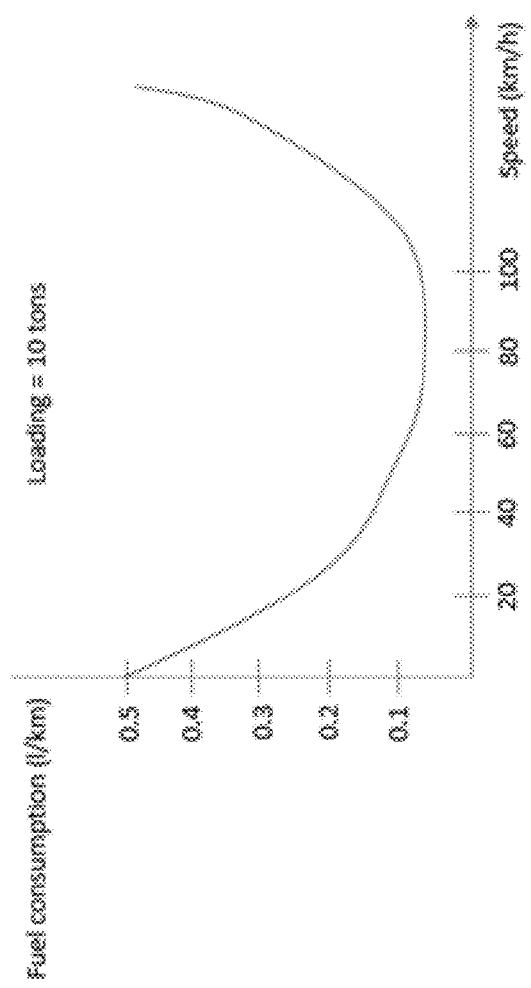
FIG. 2A is an example graph illustrating a typical fuel consumption characteristic curve for a vehicle carrying a load.

The recommended speeds for each highway segment may be based on considerations of fuel economy. Fuel consumption by a vehicle may depend on the vehicle type, vehicle load, vehicle age, vehicle condition (e.g., engine status, tire inflation, etc.). However, vehicle speed is a major determinant of fuel consumption. FIGS. 2A and AB show typical fuel consumption characteristic curves for a vehicle under different loading conditions. FIG. 2a shows, for example, a fuel consumption characteristic curve 200a for a vehicle carrying a load of 10 tons, while FIG. 3 shows, for example, a fuel consumption characteristic curve 200b for the vehicle carrying a load of 20 tons.

In an example implementation, the navigation solution described herein may be configured to operate the vehicle in manner that reduces fuel consumption when the vehicle has travel from a starting location (beginning at a starting time) to the target destination, subject to an arrival time deadline and subject to constraints on the maximum continuous driving time between stops. The navigation solution may provide a travel itinerary or schedule listing route or highway segments between stops (e.g. rest stops, service stops, etc.) along a planned route. The travel itinerary or schedule may include recommended driving speeds and recommended time intervals for breaks at the stops. The navigation solution may use an iterative algorithm (e.g., FIG. 7) to calculate a planned travel itinerary (e.g., planned map route including planned stops at designated stations, speed instructions, break times for driver rest, break times for vehicle servicing, etc., at the stops)

Figure 3:
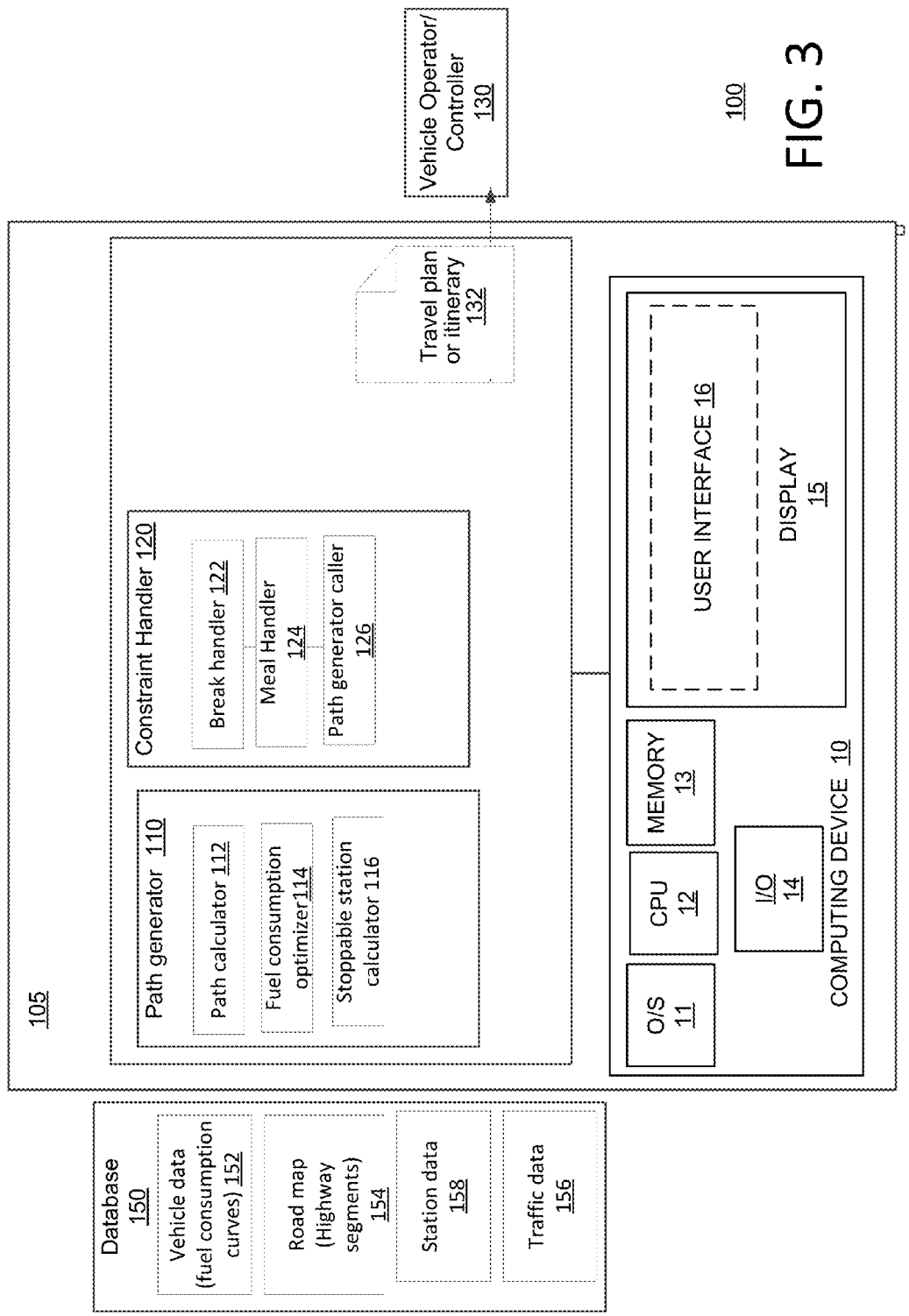
FIG. 3 is a block diagram illustration of an example system for implementing a navigation solution for controlling a vehicle's operation, while travelling from a current location to a target destination, in accordance with the principles of the present disclosure.

FIG. 3 shows an example system 100 for implementing a navigation solution for controlling a vehicle's operation, while travelling from a current location to a target destination, in accordance with the principles of the present disclosure.

System 100 may include a navigation handler 105, which may be configured to generate a planned travel itinerary 132 to control operation of a vehicle for travelling from a starting location (e.g., location A, FIG. 1) to a target location (e.g., location B, FIG. 1) in a fuel efficient manner through varying traffic and highway conditions, subject to a arrival time deadline and various constraints (e.g., constraints on maximum continuous driving time, time periods for driver rest, vehicle servicing) for reaching location B. Navigation handler 105 may send the planned travel itinerary 132 to a vehicle operator/controller 130 to control operation of the vehicle for travelling from location A to location B. Navigation handler 105 may include processes to iteratively search for paths (e.g., nodes, stations, highway segments) between location A and location B, which result in reduced fuel consumption and to ensure that the vehicle driver does not exceed a limit on maximum continuous driving time and has sufficient breaks for rest and meals, etc., and sufficient breaks for vehicle servicing (e.g., refueling).

Navigation handler 105 may be configured to receive input information, which may include, for example, the vehicle's starting location, the target location, and the arrival time deadline. Navigation handler 105 may be coupled to a database 150, which may include vehicle data 152 (including, for example, vehicle fuel efficiency data under various vehicle loading conditions), highway maps 154 which identify highway segments (e.g., highway segments between nodes or stations), historical traffic data 156 and station data 158.

Navigation handler 105 may be configured to process the input information to generate an objective function which defines the problem of travel from location A to location B subject to the fuel consumption, arrival time deadline constraints, maximum continuous driving time constraints, and rest and meal time constraints, etc. Navigation handler 105 may include a path generator 110 and a constraint handler 120. Path generator 110 in conjunction with constraint handler may be configured to minimize the objective function (subject to the constraints) iteratively to generate the planned travel itinerary (e.g., planned map route with designated rest or service stations for breaks). Constraint handler 120 may include one or more processes or modules, for example, a break handler 122, a meal handler 124 and a path generator caller 126. Path generator 110 may include one or more processes or modules, for example, a path calculator 112, a fuel consumption optimizer 114 and a stoppable station calculator 116 which modules or processes may be configured to generate highway segments for a planned route from location A to location B in conjunction with the processes or modules of constraint handler 120.

For purposes of illustration of an example objective function, which can be resolved by system 100 to generate a travel itinerary for a long haul trip between location A and location B, the example terminology shown in FIG. 4 may be used herein.

In an example scenario, it may be assumed that a network of "M" nodes or stations (e.g., service stations, reset stops, towns, cities, etc.) exists along the highways connecting location A and location B. The network of stations may be described as a station network $N_i$, i=1, 2, . . . , M. The starting location A may be designated as source station Ns. The target location B may be designated as destination station Nd. Road or highway segments between adjacent stations $N_j$ and $N_k$ over which the vehicle can be driven may be designated as $E_{jk}$, j=1, 2, . . . , M, k=1, 2, . . . , M. Each highway segment may have a respective length or distance $D_{jk}$, j=1, 2, . . . , M, k=1, 2, . . . , M. Further, it may be assumed that an average recommended vehicle speed (which is a function of time) over the highway segment between station j and station k is known. The average recommended vehicle speed for a vehicle starting at station j at time unit $T_n$, may be designated as $S_{njk}$.

Further, the travel itinerary for a vehicle with loading L being driven from source Ns to the destination Nd may be subject to the following constraints:

Starting time: Start from the source Ns after Ts, which means the starting time must be equal or greater than Ts.

Arrival time: Arrive at the destination Nd before Ta, which means the arrival time must be equal or less than Ta.

Maximum continuous driving hours: The driver cannot drive more than Td hours continuously. If the driver drives Td hours continuously, he/she has to take a break for Tb hours at a station.

Meal intervals: The driver has to have a meal at a station within Ti hours after the previous meal and the driver is given Tm hours to have a meal.

Figure 2B:
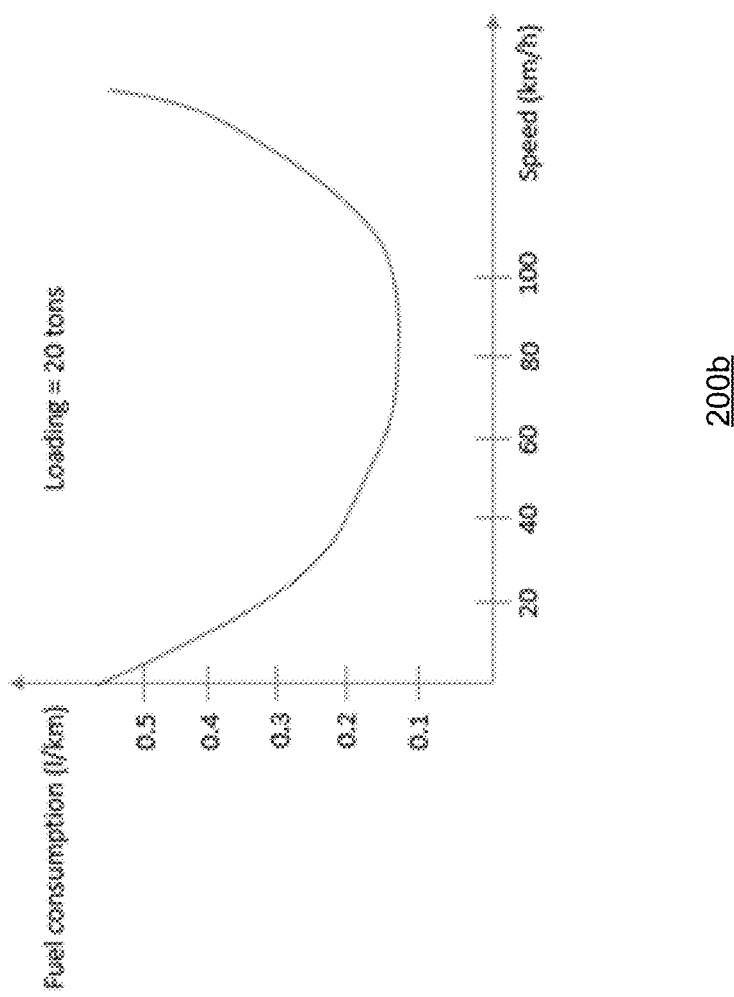
FIG. 2B is an example graph illustrating a typical fuel consumption characteristic curve for a vehicle carrying a load.

Navigation handler 105 may minimize the objective function to create a recommended or planned route between the source station Ns and the destination station Nd, which includes identification of the stations designated or taking breaks and the time intervals for such breaks. Navigation handler 105 may further minimize the objective function with respect to fuel consumption to create the recommended or planned route. A fuel consumption curve corresponding to the vehicle loading may be used to define the objective function with respect to fuel consumption. For example, if the vehicle is carrying a load of 10 tons, then the fuel consumption curve 200a (FIG. 2a) may be used to determine fuel consumption as a function of vehicle speed. If the vehicle is carrying a load of 20 tons, then the fuel consumption curve 200*b* (FIG. 2*b*) may be used to determine fuel consumption as a function of vehicle speed.

In example implementations, navigation handler 105 may be configured to generate the planned travel itinerary 132 (e.g., planned map route, speed instructions, and break stations and break times) using algorithms based on an example "fuel consumption" model relating fuel consumption and travel along highway segments of the route from location A to location B.

Fuel consumption optimizer 114 may include processes to determine fuel consumption, for example, for the highway segments generated by path calculator 112 and stoppable station calculator 116 in path generator 110. Path calculator 112 and stoppable station calculator 116 may generate the highway segments in conjunction with a break handler, a meal handler and a path generation caller in constraint handler 120 to identify highway segments and designated "break" stations (i.e. stoppable stations) to be included in travel itinerary 132.

Navigation handler 105 may be configured to dynamically update and send the travel plan or itinerary 132 to vehicle operator/controller 130 for travel from location A to location B.

In system 100, navigation handler 105 and other system components (e.g., database 150, vehicle operator/controller 130, etc.) may be hosted on one or more standalone or networked physical or virtual computing machines including computing machines that may be installed in the vehicle itself. FIG. 1 shows, for example, navigation handler 105 hosted on a computing device 10 (e.g., a desktop computer, a mainframe computer, a server, a personal computer, a mobile computing device, a laptop, a tablet, or a smart phone), which may be available to a user. Computing device 10, which includes an O/S 11, a CPU 12, a memory 13, and I/O 14, may further include or be coupled to a display 15 (including, for example, a user interface 16). Planned map route, speed instructions, and break instructions generated by navigation handler 105 may be presented to the user as travel itinerary 132, for example, on user interface 16.

Moreover, although computer 10 is illustrated in the example of FIG. 1 as a single computer, it may be understood that computer 10 may represent two or more computers in communication with one another. Therefore, it will also be appreciated that any two or more components of system 100 may similarly be executed using some or all of the two or more computing devices in communication with one another. Conversely, it also may be appreciated that various components (e.g., database 150, etc.) illustrated as being external to computer 10 may actually be implemented therewith.

Navigation handler 105 may be linked, for example, via Internet or intranet connections, to database 150 and vehicle operator/controller 130. Further, navigation handler 105 may be linked to data sources on the web (e.g., worldwide and/or enterprise webs) and/or or other computer systems of the organization (e.g., e-mail systems, human resource systems, material systems, operations, etc.) that may have information relevant to the generation and implementation of the planned travel itinerary (e.g., travel itinerary 132) generated by navigation handler 105.

In example implementations, navigation handler 105 may be configured to generate travel itinerary 132 (e.g., planned map route, speed instructions, and break stations and time) using algorithms based on an example "fuel consumption" model relating fuel consumption and travel along highway segments of the route from location A to Location B.

Example Fuel Consumption Model

The fuel consumption model used by navigation handler 105 is designed to determine a planned route or path for the vehicle, which may result in minimum fuel consumption, in dynamic traffic and highway conditions, subject to arrival time constraints.

A highway segment in the model may defined by starting with a first node or station (beginning of the highway segment) and then searching for and selecting a next node or station (end of the highway segment). The number of nodes (and hence the number of highway segments) in the planned route or path for the vehicle may be a variable number "n". The selection of the next node or station (from one or more potential next nodes) may not be determined by consideration of minimum distance alone but may include consideration of fuel consumption and traffic conditions. The length of a highway segment may not be selected to simply yield the minimum distance between locations A and B because it may be possible to take a longer route (e.g., to go around traffic jams) to satisfy the arrival time constraints, and because it may be possible to travel a longer route at vehicle speeds which result in better fuel efficiency than to travel a shorter route at inefficient vehicle speeds. The model may make a balanced trade-off between the arrival time (or shortest distance) and fuel consumption. Further, the model may include consideration of dynamic traffic conditions along the various highway segments and account for predicted or anticipated traffic conditions along the various highway segments between locations A and B.

Example Algorithm for Generating the Planned Travel Itinerary

An example iterative algorithm which may be used by navigation handler 105 to generate the planned travel itinerary (e.g., travel itinerary 132) is described below (e.g., with reference to FIG. 7). The example algorithm may use dynamic predicted or anticipated traffic condition information in addition to arrival time constraints when selecting the next node or station (e.g., node 2) from amongst one or more potential next nodes or stations to define a highway segment (e.g., highway segment 1). Further, the example algorithm when selecting the next node (e.g., node 2) may take into account, current accumulated fuel consumption and the estimated fuel consumption.

The example algorithm may determine the planned travel itinerary (e.g., travel itinerary 132) by minimizing an objective function, which may be constructed by objective generation module 128 to describe the travel of the vehicle from a starting location to a target location. The example terminology shown in FIG. 4 may be used herein to describe the objective function and the example algorithm.

An objective function for minimizing fuel consumption in the travel of the vehicle from a starting location to a target location subject to arrival time deadline constraint may be formulated as calculating or selecting highway segments between stations (including break stations for rest stops and vehicle servicing) so that the vehicle starting at location A at a starting time "Ts" arrives at location B before an arrival deadline time "Ta" with the least amount of fuel consumption.

Navigating solution handler 105 in system 100 may minimize an objective function for a particular vehicle load (e.g. 10 tons) by using the speed-fuel consumption curve for the particular vehicle load (e.g. FIG. 2*a*) to generate the travel itinerary from source station Ns to destination station Nd. An example objective function for given vehicle load and speed-fuel consumption curve may be $$\text{Minimize}(\Sigma_{j=1}^{M}\Sigma_{k=1}^{M}\Sigma_{n=0}^{N}X(n,j,k)F(n,j,k)),$$

subject to the following constraints:
With the following constraints:
$\Sigma_{k=1}^{M}\Sigma_{n=0}^{N}X(n,Ns,k)=1$ (i.e. start from Ns)
$\Sigma_{j=1}^{M}\Sigma_{n=0}^{N}X(n,j,Nd)=1$ (i.e. start end at Nd)
Min{n|X(n,j,k),X(n,j,k)=1}≥0 (i.e. starting time constraint)
Max{n|X(n,j,k),X(n,j,k)=1}≤N (i.e. arrival time constraint)
For all {n|Y(n,i),Y(n,i)=1} in an ascending order, n−(n'+Tb)≤Td,n' is the previous break of n (i.e. the maximum continuous driving hours constraint)
For all {n|Z(n,i)Z(n,i)=1} in an ascending order, n−(n'+Tm)≤Ti,n' is the previous meal of n (i.e. the meal interval constraint).

Navigation handler 105 may be configured to minimize the foregoing objective function in conjunction with input data, which may be available, for example, from database 150. The input data may, for example, include vehicle data (fuel consumption curves) 152, roadmap (highway segments) 154, historical traffic data 156, and stations data 158.

FIG. 5 shows Table (Fuel Consumption) 501, Table (Highway Segments) 502, Table 503 (Historical Traffic data), and Table 504 (Stations data), which illustrate the input data that may be available from the foregoing databases 152-156. Table (Fuel Consumption) 501 may include metadata of vehicle fuel consumption (e.g., vehicle load, vehicle speed and vehicle fuel consumption, etc.). Table (Highway Segments) 502 may include metadata for all highway segments (e.g., highway segment ID, highway segment name, starting station A, ending station B, and length or distance between station A and station B, etc.). Table 503 (Historical traffic data) 502 may include metadata related to historical traffic data for the highway segments (e.g., identity of highway segment, start time from station A, and Average speed on the highway segment). Table 504 (Stations data) may include metadata or information on stations (e.g., station ID, station name, availability of the station for a driver break, availability of meals for the driver, etc.)

FIG. 6 illustrate Tables 602-604 that include output data (i.e., path, breaks and meals, respectively) which may be included by navigation handler 105 in planned travel itinerary 132 obtained by minimizing the objective function. The path output data, as shown in Table 601, may, for example, include sequence of the path, identity of highway segment, start time from station A, suggested speed on the highway segment, fuel consumption on the highway segment, and time used at the highway segment. The break output data, as shown in Table 602, may for example, include sequence of the break, time of break (when to have), station ID (where to have a break). The meal output data, as shown in Table 603, may for example, include sequence of the meal, time of meal (when to have), station ID (where to have a meal).

Figure 7:
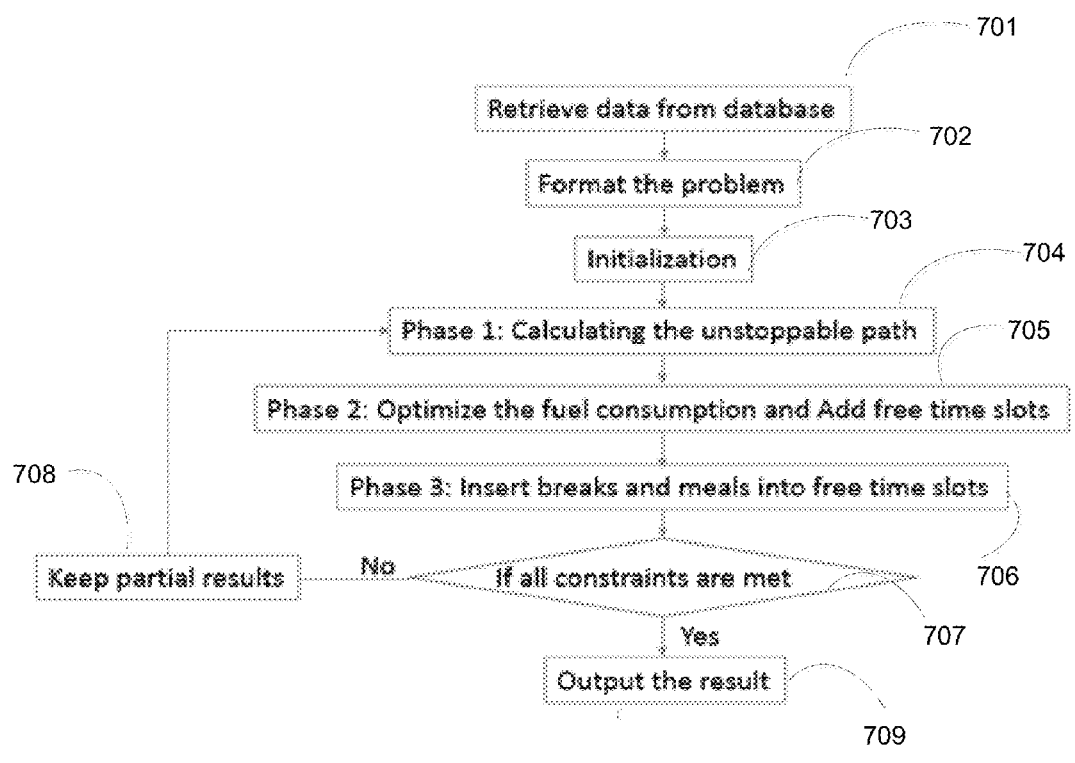
FIG. 7 is a flow chart illustrating an example method for generating a planned travel itinerary (e.g., planned map route and break instructions) by a navigation handler, in accordance with the principles of the present disclosure.

FIG. 7 shows an example method 700 for generating planned travel itinerary 132 (e.g., planned map route including designated stations for breaks and meals) by navigation handler 105 (using the foregoing objective function).

Method 700 may involve three stages of trip planning. In a first stage, a minimum fuel consumption F(n,i) at time $T_n$ from a node i to the next node may be calculated with path and speed at each edge. The second stage may involve searching for stoppable stations (i.e. stations having facilities for driver rest or meals, or for vehicle refueling) and optimizing the fuel consumption based on the path determined in the first stage. The third stage may involve inserting breaks and meals into the stoppable stations and updating the path if needed to satisfy all constraints on the travel itinerary.

Method 700 may be performed by, or implemented using, for example, system 100 (FIG. 1).

With reference to FIG. 7, method 700 may include retrieving input data from databases (701), formatting the data (702) and initializing input parameters and variables (703). Retrieving input data from the databases 701 may include retrieving vehicle fuel consumption efficiency data from database 152, highway segment data from database 154, historical traffic data from database 156 and station data or information from database 158. Formatting the data 702 may involve formatting the data to a format suitable for processing by other components (e.g., path generator 110 and fuel consumption optimizer 112, etc.) of navigation handler 105. Initializing input parameters and variables 703 may involve initializing the input parameter and variables for a specific use instance, based, for example, on user inputs for the specific use instance (e.g., travel from source station Nd to destination station Nd, start time and arrival time constraints, etc.). In an example implementation, the following input parameter and variables may be initialized:
L: Loading i.e. vehicle load (weight)
Ns: Source
Nd: Destination
Ts: Starting time
Ta: Arrival time
Td: Maximum continuous driving hours
Tb: Break time
Ti: Meal interval
Tm: Meal time
S(n,j,k): Predicted speed at each highway segment at each time unit.

Initializing input parameters and variables 703 may include choosing a speed fuel consumption curve based on vehicle load L.

After initializing input parameters and variables, method 700 may further include, in stage 1 of the method, calculating an unstoppable path (i.e. an uninterrupted highway segment and speed) (704); in stage 2 of the method, optimizing fuel consumption and adding free time slots (705); and in stage 3 of the method, inserting breaks and meals into the free time slots (706). Next, in method 700, a determination may be made if all constraints are satisfied by the travel itinerary computed so far (707). When the travel itinerary computed so far does not satisfy all constraints, method 700 may save partial results (708) for iteration through stage 1 of the method beginning at 704. When the travel itinerary computed so far satisfies all constraints, method 700 may output the results as the recommended fuel efficient travel plan (e.g., travel itinerary 132) for driving the vehicle to the destination over paths with breaks (e.g. rest, meals, etc.) for satisfying the maximum continuous driving time limits.

In method 700, stage 1, calculating an unstoppable path (i.e. an uninterrupted highway segment and speed) 704 may include the following processes:
a) For all stations, initialize all F(n,i)=∞ and F(n,Nd)=0. If n+T(n,j,k)>N, then F(n,j,k)=∞
b) Create a List and insert the destination Nd into List
c) If List is not empty, go to d); if List is empty, go to f)
d) Select the first node from List as the current node j and delete this node from List. If Nd is once deleted from List, never insert it into List again.

e) For all neighbors node i to the current node and in each neighbor for all time units, finish the following task and then go to c):
   If $F(n,i)>F(n,i,j)+F(n+T(n,i,j),j)$, then $F(n,i)=F(n,i,j)+F(n+T(n,i,j),j)$ and $S(i)=j$
   If at least one among the following fuel consumption is reduced and node i is not in List, insert node i into List $F(n,i)$, $n=0, 1, 2, \ldots, N$
f) All $F(n,i)$ are calculated which represents the minimum fuel consumption at time $T_n$ from node i to destination with path and speed at each edge. At this step, $\text{Min}(F(n,Ns), n=0, 1, 2, \ldots, N)$ becomes the minimum fuel consumption solution when ignoring break and meal constraints. $\text{Node}_i$, $i=1, 2, \ldots, P$ may be used to represent the optimal path ($\text{Node}_1=Ns$, $\text{Node}_P=Nd$), and $\text{Time}_i$, $i=1, 2, \ldots, P$ to represent the starting time of each node ($\text{Time}_1$ should be the actual starting time and $\text{Time}_P$ should be the actual arrival time).

In method 700, stage 2, optimizing fuel consumption and adding free time slots 705 may include the following processes:
g) For all $\text{Node}_i$, $i=1, 2, \ldots, P$, assuming we allow truck to stop at the station, calculate the minimum $F(n,j,k)'$, $j=1, 2, \ldots, P$, $k=1, 2, \ldots, P$, $j<k$, $\text{Time}_j \leq n \leq \text{Time}_k$ if $\text{Node}_j$ and $\text{Node}_k$ are connected. If $F(n,j,k)>F(n,j,k)'$, $F(n,j,k)=F(n,j,k)'$ and update the corresponding $\text{Node}_i$ and $\text{Time}_i$
h) For all optimized $F(n,j,k)$, combine the path with most free time and update the corresponding Node and $\text{Time}_i$. At this step we have the new $\text{Node}_i$, $i=1, 2, \ldots, P$ and $\text{Time}_i$, $i=1, 2, \ldots, P$. Besides we have other two data structures. One is $\text{Stop}_i$, $i=1, 2, \ldots, P$ which means the stoppable time at each station in the optimal path. If there is no free time at the station i, Stop=0. Another data structure is $ST_i$, $i=1, 2, \ldots, P$ which keeps the starting time unit of the free time.

Further In method 700, stage 3, inserting breaks and meals into the free time slots 706 may include the following processes:
i) From $\text{Stop}_P$ to $\text{Stop}_1$, insert breaks Tb and meals Tm to meets the interval constraints Td and Ti. Update $Y(n,i)$ and $Z(n,i)$
j) If at $\text{Stop}_i$ the constraints cannot be met, keep the partial path and starting time from $\text{Stop}_i$ to $\text{Stop}_P$. For the left path from $\text{Stop}_1$ to $\text{Stop}_i$, repeat stage 1 to stage 3 until all constraints are met.

FIG. 8 shows example pseudo-code 800, which may be used for performing the elements of method 700 described above. Pseudo-code 800 or similar code may be used, for example, to configure the modules or processes of navigation handler 105 (e.g., path generator 110 and constraint handler 120, etc.) to implement method 700.

In example implementations, the vehicle may be configured with electronics and control systems to control operation of the vehicle. The electronics and control systems may use planned map route and speed instructions 132 to control travel of the vehicle from the starting location to the target location, for example, to achieve efficient fuel consumption, conform to maximum continuous driving limits and provide meal and rest stops to drivers.

Figure 9:
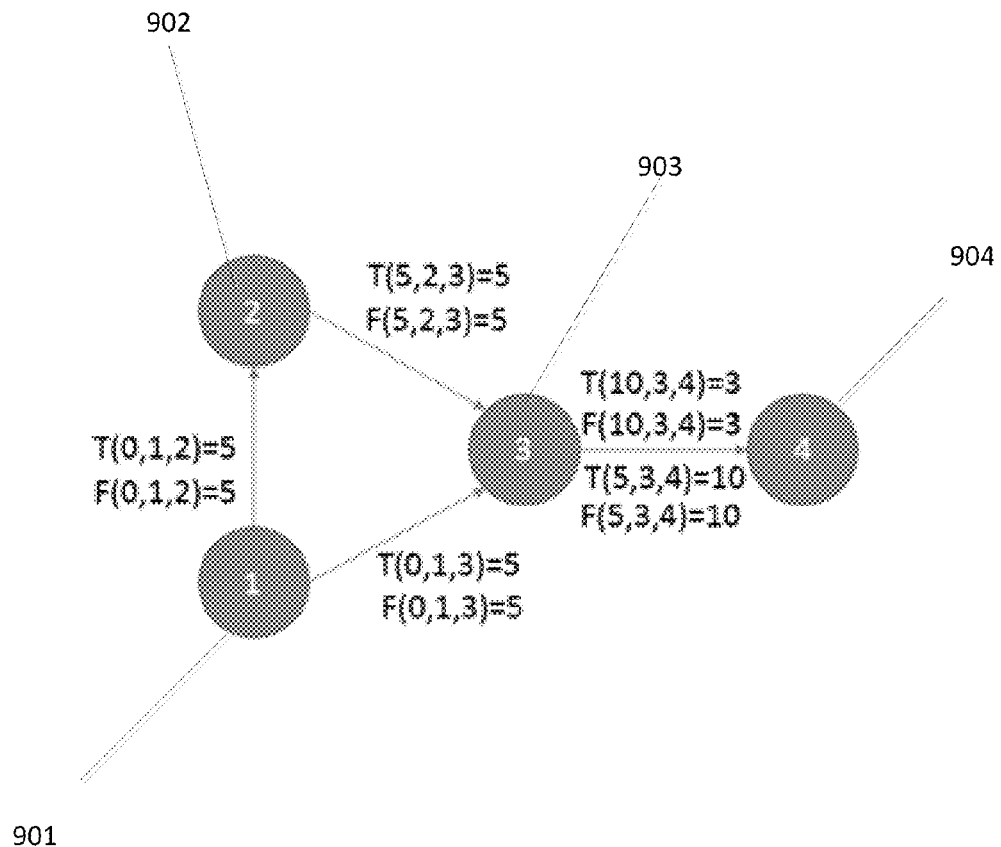
FIG. 9 is an illustration of an of how trip planning can benefit fuel economy by shifting travel times or travel paths for fuel efficient driving based on time-dependent traffic conditions, in accordance with the principles of the present disclosure.

FIG. 9 illustrates how trip planning (e.g., by system 100 and method 7000 can benefit fuel economy in an example scenario 900 by shifting travel times or travel paths for fuel efficient driving based on time-dependent traffic conditions. In example scenario 900, may include a network of stations (e.g., four stations 901, 902, 903 and 904). A vehicle may be driven from a starting station (e.g., station 901) to a destination station (e.g., station 904). Different travel itineraries or solutions (e.g., Solutions 1, 2 and 3), which may be generated by system 100, may involve travel over different paths or stations between station 901 and station 904. In Solution 1, the vehicle may be driven from station 901 to station 903 and then to station 904. The travel times and fuel consumption in Solution 1 over highway segments station 901-station 903 and station 903-station 904 are shown, for example, in Table 1 below.

TABLE 1

Solution 1: 1 -> 3 -> 4

| Start from | Go to | Start time | Time used (hours) | Fuel used (units) |
|---|---|---|---|---|
| 1 | 3 | 0 | 5 | 5 |
| 3 | 4 | 5 | 10 | 10 |

In Solution 2, the vehicle may travel from station 901 to station 902, then to station 903 and then to station 904. The travel times and fuel consumption in Solution 2 over highway segments station 901-station 902, station 902-station 903, and station 903-station 904 are shown, for example, in Table 2 below.

TABLE 2

Solution 2: 1 -> 2 -> 3 -> 4

| Start from | Go to | Start time | Time used (hours) | Fuel used (units) |
|---|---|---|---|---|
| 1 | 2 | 0 | 5 | 5 |
| 2 | 3 | 5 | 5 | 5 |
| 3 | 4 | 10 | 3 | 3 |

From the above tables it will be noted that for Solution 1, which involves travel over the shortest path and through the least number of stations (e.g., one) between the source station and destination station, total fuel consumption is 15 units and the travel time is 15 hours.

In contrast, for Solution 2, which involves travel over a longer path and through a larger number of stations (e.g., 2) than Solution 1, total fuel consumption is 13 units and the travel time is 13 hours. Even though travel distance in Solution 2 is larger that in Solution 1, fuel consumption is lower.

The fuel consumption may be further improved or lowered by Solution 3. In Solution 3, like in Solution 1, the vehicle may travel from station 901 to station 903 and then to station 904. However, unlike in Solution 1 in which the vehicle does not stop, in Solution 3, the vehicle may stop at station 903 for 5 hours (which can be used to break continuous driving time or for a meal or rest break for the driver) and restart driving after traffic conditions on segment station 903-station 904 may have improved. The travel times and fuel consumption in Solution 3 over highway segments station 901-station 903 and station 903-station 904 are shown, for example, in Table 3 below.

TABLE 3

Solution 503: 1 -> 3 (stop) -> 4

| Start from | Go to | Start time | Time used (hours) | Fuel used |
|---|---|---|---|---|
| 1. 1 | 3 | 0 | 5 | 5 |
| 2. 3 | 4 | 10 | 3 | 3 |

From the above tables it will be noted that for Solution 3, which involves travel over the same path and through the same number of stations as Solution 1, total fuel consumption is 8 units, which is less than the fuel consumption of 15 units in Solution 1 while the travel time in both solutions is 13 hours.

The various systems and techniques described herein may be implemented in digital electronic circuitry, or in computer hardware, firmware, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for controlling operation of a vehicle travelling from a starting location to a target location, the method comprising:
    generating a travel itinerary by selecting different highway segments on a map for the vehicle to drive over at respective speeds from the starting location to the target location subject to an arrival time deadline for arriving at the target location, each highway segment having a distance that can be driven at the respective speed in less than a continuous driving time limit;
    sending the travel itinerary to a vehicle drive controller, the travel itinerary including instructions to make a stop at the end of each highway segment to stay below the continuous driving time limit; and
    controlling operation of the vehicle, by the vehicle drive controller, to drive the vehicle over the different highway segments at the respective speeds from the starting location to the target location while making the stop at the end of each highway segment to stay below the continuous driving time limit according to the received travel itinerary.

2. The method of claim 1, wherein selecting the different highway segments includes identifying a station at the end of each highway segment where the operator of the vehicle can rest, take a meal, or refuel the vehicle.

3. The method of claim 1, wherein the instructions to make a stop at the end of each highway segment include a recommended break time or a recommended meal time for the stop.

4. The method of claim 1, wherein selecting the different highway segments includes, identifying a start time for each highway segment and determining the respective speed based on historical traffic conditions over the highway segment at the start time.

5. The method of claim 4, wherein selecting the different highway segments further includes determining a fuel consumption of the vehicle for each highway segment based on the determined respective speed and a speed-fuel consumption characteristic of the vehicle.

6. The method of claim 5, wherein determining a fuel consumption of the vehicle for each highway segment includes using a load-dependent speed-fuel consumption characteristic of the vehicle.

7. The method of claim 5, wherein selecting the different highway segments includes selecting the different highway segments to minimize a total fuel consumption in driving the vehicle from the starting location to the target location.

8. A computer system for controlling operation of a vehicle travelling from a starting location to a target location, the system comprising a memory and a semiconductor-based processor, the memory and the processor forming one or more logic circuits configured to:
- generate a travel itinerary by selecting different highway segments on a map for the vehicle to drive over at respective speeds from the starting location to the target location subject to an arrival time deadline for arriving at the target location, each highway segment having a distance that can be driven at the respective speed in less than a continuous driving time limit; and
- send the travel itinerary to a vehicle drive controller, the travel itinerary including instructions to make a stop at the end of each highway segment to stay below the continuous driving time limit; and
- control operation of the vehicle, by the vehicle drive controller, to drive the vehicle over the different highway segments at the respective speeds from the starting location to the target location while making the stop at the end of each highway segment to stay below the continuous driving time limit according to the received travel itinerary.

9. The computer system of claim 8, wherein selecting the different highway segments includes identifying a station at the end of each highway segment where the operator of the vehicle can rest, take a meal, or refuel the vehicle.

10. The computer system of claim 8, wherein the instructions to make a stop at the end of each highway segment include a recommended break time or a recommended meal time for the stop.

11. The computer system of claim 8, wherein selecting the different highway segments includes, identifying a start time for each highway segment and determining the respective speed based on historical traffic conditions over the highway segment at the start time.

12. The computer system of claim 11, wherein selecting the different highway segments further includes determining a fuel consumption of the vehicle for each highway segment based on the determined respective speed and a speed-fuel consumption characteristic of the vehicle.

13. The computer system of claim 12, wherein determining a fuel consumption of the vehicle for each highway segment includes using a load-dependent speed-fuel consumption characteristic of the vehicle.

14. The computer system of claim 12, wherein selecting the different highway segments includes selecting the different highway segments to minimize a total fuel consumption in driving the vehicle from the starting location to the target location.

15. A non-transitory computer readable storage medium having instructions stored thereon, including instructions which, when executed by a microprocessor, cause a computer system to:
- generate a travel itinerary by selecting different highway segments on a map for the vehicle to drive over at respective speeds from the starting location to the target location subject to an arrival time deadline for arriving at the target location, each highway segment having a distance that can be driven at the respective speed in less than a continuous driving time limit;
- send the travel itinerary to a vehicle operator to drive the vehicle over the different highway segments at the respective speeds from the starting location to the target location, the travel itinerary including instructions to make a stop at the end of each highway segment to stay below the continuous driving time limit; and
- control operation of the vehicle, by the vehicle drive controller, to drive the vehicle over the different highway segments at the respective speeds from the starting location to the target location while making the stop at the end of each highway segment to stay below the continuous driving time limit according to the received travel itinerary.

16. The non-transitory computer readable storage medium of claim 15, wherein the instructions, when executed by a microprocessor, further cause the computer system to:
- identify a station at the end of each highway segment where the operator of the vehicle can rest, take a meal, or refuel the vehicle.

17. The non-transitory computer readable storage medium of claim 15, wherein the instructions in the travel itinerary to make a stop at the end of each highway segment include a recommended break time or a recommended meal time for the stop.

18. The non-transitory computer readable storage medium of claim 15, wherein the instructions, when executed by a microprocessor, further cause the computer system to:
- identify a start time for each highway segment and determine the respective speed based on historical traffic conditions over the highway segment at the start time.

19. The non-transitory computer readable storage medium of claim 18, wherein the instructions, when executed by a microprocessor, further cause the computer system to:
- determine a fuel consumption of the vehicle for each highway segment based on the determined respective speed and a speed-fuel consumption characteristic of the vehicle.

20. The non-transitory computer readable storage medium of claim 19, wherein the instructions, when executed by a microprocessor, further cause the computer system to:
- determine the fuel consumption of the vehicle for each highway segment by using a load-dependent speed-fuel consumption characteristic of the vehicle.

* * * * *